US011063930B1

(12) United States Patent
Bose

(10) Patent No.: US 11,063,930 B1
(45) Date of Patent: Jul. 13, 2021

(54) RESOURCE ACCESS PROVISIONING FOR ON-PREMISES NETWORK CLIENT DEVICES

(71) Applicant: Amazon Technologies, Inc., Seattle, WA (US)

(72) Inventor: Avik Bose, Lynnwood, WA (US)

(73) Assignee: Amazon Technologies, Inc., Seattle, WA (US)

( * ) Notice: Subject to any disclaimer, the term of this patent is extended or adjusted under 35 U.S.C. 154(b) by 335 days.

(21) Appl. No.: 15/870,653

(22) Filed: Jan. 12, 2018

(51) Int. Cl.
| | |
|---|---|
| *H04L 29/06* | (2006.01) |
| *H04L 29/08* | (2006.01) |
| *G06F 16/951* | (2019.01) |
| *H04L 29/12* | (2006.01) |
| *H04L 12/24* | (2006.01) |

(52) U.S. Cl.
CPC .......... *H04L 63/083* (2013.01); *G06F 16/951* (2019.01); *H04L 63/0428* (2013.01); *H04L 63/068* (2013.01); *H04L 63/0807* (2013.01); *H04L 63/104* (2013.01); *H04L 67/02* (2013.01); *H04L 41/5083* (2013.01); *H04L 61/15* (2013.01); *H04L 61/6095* (2013.01)

(58) Field of Classification Search
CPC . G06F 16/951; H04L 63/0428; H04L 63/068; H04L 63/0807; H04L 63/104; H04L 67/02; H04L 41/5083; H04L 61/15; H04L 61/6095
See application file for complete search history.

(56) References Cited

U.S. PATENT DOCUMENTS

| | | | |
|---|---|---|---|
| 9,762,563 B2* | 9/2017 | Davis | H04L 67/10 |
| 2007/0006291 A1* | 1/2007 | Barari | H04L 63/0884 726/10 |
| 2016/0337354 A1* | 11/2016 | Smadja | H04W 4/70 |
| 2017/0230352 A1* | 8/2017 | Chen | H04L 63/061 |
| 2018/0309748 A1* | 10/2018 | Li | H04L 63/0815 |

* cited by examiner

*Primary Examiner* — Mohammed Waliullah
(74) *Attorney, Agent, or Firm* — Davis Wright Tremaine LLP

(57) ABSTRACT

A managed directory service receives, from a computer system operated in a first network, a request to obtain a set of credentials usable to access resources in a second network. In response to the request, the managed directory service determines, based at least in part on a first set of permissions in a directory maintained in the second network, that the computer system is authorized to receive the set of credentials. The managed directory service provides the set of credentials to the computer system, which enables use of the set of credentials to identify a second set of permissions for accessing resources in the second network.

20 Claims, 9 Drawing Sheets

RESOURCE ACCESS PROVISIONING FOR ON-PREMISES NETWORK CLIENT DEVICES

BACKGROUND

Customers of a computing resource service provider often manage a variety of client devices within their networks (e.g., on-premises networks) to support their business needs. A customer can utilize a client device to access a variety of resources and services by the computing resource service provider via a remote network (e.g., off-premises network). However, configuring the client device to access these resources and services within the off-premises network can be difficult and labor intensive. Further, ensuring that the appropriate policies are applied to requests from a client device operating within an on-premises network to access these resources services within the off-premises network is difficult.

BRIEF DESCRIPTION OF THE DRAWINGS

Various techniques will be described with reference to the drawings, in which.

DETAILED DESCRIPTION

Figure 1:
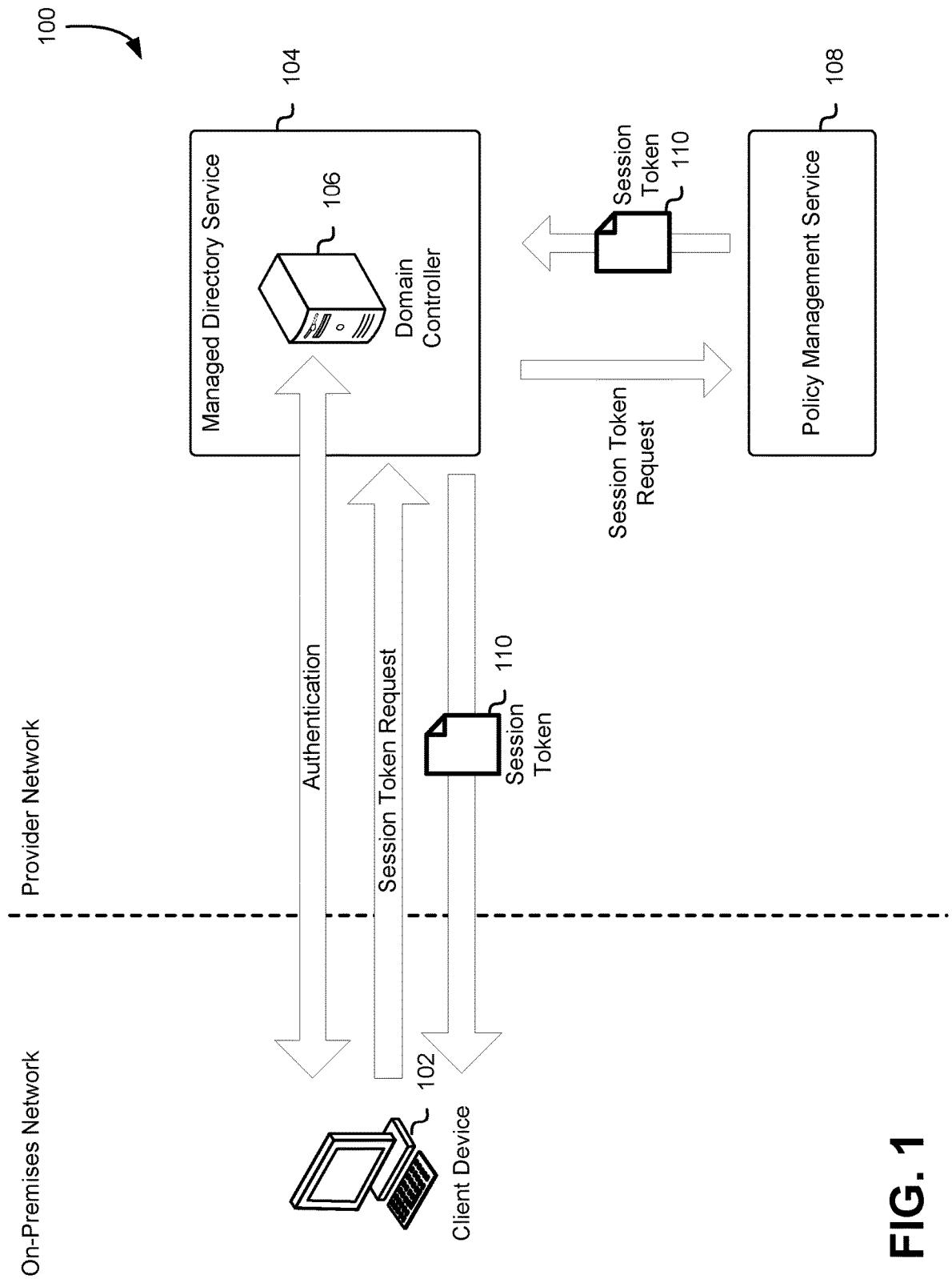
FIG. 1 shows an illustrative example of a system in which various embodiments can be implemented.

Techniques described and suggested herein relate to leveraging managed directories and session tokens to enable client devices operating within an on-premises network to access computing resources within a computing resource service provider network. In an embodiment, a client device operating within an on-premises network submits a request to a domain controller operating within a managed directory service provided by a computing resource service provider in an off-premises network to obtain a ticket-granting ticket. This ticket-granting ticket is used to apply for a service ticket to a service or application that is to be accessed by the client device. In an embodiment, the domain controller utilizes credential information provided by the client device to validate the request and authenticate the client device. In an embodiment, if the client device is authenticated, the domain controller issues the ticket-granting ticket to the client device. In an embodiment, the client device utilizes the ticket-granting ticket to obtain a service ticket usable to access an application within the on-premises network to submit a web service request to the computing resource service provider to obtain a session token for accessing resources provided by the computing resource service provider.

In an embodiment, the client device submits a request to the managed directory service to obtain a session token usable to access resources and services provided by the computing resource service provider. In an embodiment, the request includes the service ticket, which is used by the managed directory service to authenticate the client device. In response to the request, the managed directory service identifies a directory associated with the client device (e.g., a customer that maintains the client device can also maintain a directory within the managed directory service). In an embodiment, the managed directory service evaluates the directory to determine whether it is configured for the use of session tokens to enable access to resources and services of the computing resource service provider. If the directory is configured for the use of session tokens, the managed directory service queries a security group database to determine whether the user of the client device is a member of a particular security group. In an embodiment, the security group is utilized to identify a security role that can be assumed by users to access resources and services of the computing resource service provider. The security role, in an embodiment, is associated with a set of access control policies that can be applied to requests to access these resources and services to determine whether a user is authorized to do so.

In an embodiment, the managed directory service transmits a request to a policy management service to obtain the session token requested by the client device. The request to the policy management service, in an embodiment, includes information about the user of the client device. This information is used by the policy management service to identify a set of access control policies that are applicable to the request, which may be due to an association of the policy with the user or otherwise applicable to the request. Based at least in part on these access control policies, the policy management service determines whether the user is authorized to obtain the session token. In an embodiment, if the user is authorized to obtain the session token, the policy management service generates the session token and provides the session token, an access key, and a cryptographic key to the managed directory service. In an embodiment, the cryptographic key is usable by the user to digitally sign the session token, which can be provided, along with the access key, in a request to access resources and services of the computing resource service provider. The managed directory service provides the session token, the access key, and the cryptographic key to the client device to fulfill the request from the client device. In an embodiment, the session token is subject to an expiration time, after which the session token is no longer valid for use.

In an embodiment, the client device submits a request to the computing resource service provider to access a resource or service provided by the computing resource service provider. In an embodiment, the request includes the digitally signed session token, as well as the access key provided by the policy management service. In an embodiment, the policy management service validates the digital signature and uses the session token to authenticate the access key and the request. If the request and access key are authenticated, the policy management service identifies a set of policies applicable to the request to determine whether fulfillment of the request is authorized. If fulfillment of the request is authorized based at least in part on the identified set of policies, the policy management service transmits a notification to the computing resource service provider that causes the computing resource service provider to fulfill the request. In an embodiment, if the session token and/or the access key have expired, the request is not authenticated and is denied. In an embodiment, if the request is denied due to expiration of the session token and/or the access key, the client device can submit a new request to the managed directory service to issue a new session token, cryptographic key, and access key.

In this manner, a user of a client device operated within an on-premises network can leverage its managed directory operated in an off-premises network to access resources and services provided by a computing resource service provider. In addition, the techniques described and suggested herein facilitate additional technical advantages. In an embodiment, the security group database maintained by the managed directory service is utilized to determine whether a user of the client device is a member of a security group that associated with a particular role that, if assumed within the computing resource service provider network, can correspond to access control policies. The user can be a member of various security groups. Thus, in the request to obtain the session token, a user of the client device can specify which role it would like to assume within the computing resource service provider network. In an embodiment, if the user is a member of a security group associated with the requested role, the session token can be provided to the user. Thus, user specification of a desired role can be used for further validation of the user's request to obtain the session token.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of a system 100 in which various embodiments can be implemented. In the system 100, a client device 102 operating within an on-premises network transmits a request to a domain controller 106 of a managed directory service 104 operating in a computing resource service provider network to obtain a ticket-granting ticket. In an embodiment, the on-premises network is distinct from the computing resource service provider network. In an embodiment, the managed directory service 104 provides a variety of services to enable computer systems and client devices, such as client device 102, to access customer directories including, but not limited to, authentication, authorization, and directory services. The managed directory service 104, in an embodiment, provides authentication services which authenticate credentials of a user, computer system, process, automated process or other such entity to at least determine whether that entity is authorized to access the managed directory service 104 and/or the customer directories associated with the managed directory service 104. In an embodiment, the credentials are authenticated by the managed directory service 104 itself, or by a process, program or service under the control of the managed directory service 104, or by a process, program or service that the managed directory service 104 communicates with, or by a combination of these and/or other such services or entities.

In an embodiment, the domain controller 106 is a server, computer system, or application that responds to authentication requests within a computing domain and enables access to domain resources and services. In an embodiment, the client device 102 is any device that is capable of connecting with a computer system via network, including at least servers, laptops, mobile devices, distributed computing systems and components thereof, abstracted components such as guest computer systems or virtual machines and/or other types of computing devices and/or components. In an embodiment, the client device 102 includes one or more local computer system resources which are located at least in part on customer premises (e.g., on-premises) and which store files and/or other computer system resources thereon including, but not limited to, directories, applications, data, databases, links to other computer system resources, system drivers, computer operating systems, virtual machines and/or other such resources.

In an embodiment, the domain controller and the client device 102 operate using the Kerberos protocol for authentication. In an embodiment, a user of the client device 102 provides credential information of the user, which the client device 102 provides to the domain controller 106 in an authentication service request. In an embodiment, the client device 102 encrypts a timestamp corresponding to the time at which the user provider its credentials using a hash of these credentials. This encrypted timestamp is used by the domain controller 106 to determine whether the request has expired. If the domain controller 106 determines, based at least in part on the timestamp, that the request has expired, the domain controller 106 rejects the request. In an embodiment, if the request has not expired, the domain controller 106 transmits a message to the client device 102. This message includes a ticket-granting ticket, which is cached within the client device 102. The ticket-granting ticket is utilized by the client device 102 to generate a service ticket that can be used by the user of the client device 102 to submit a web service request to the managed directory service 104 to obtain a session token for accessing computing resources and services provided by the computing resource service provider within the computing resource service provider network. It should be noted that while the Kerberos protocol is utilized as an illustrative example for authentication of client devices and of the domain controller 106 in a domain, other techniques can be utilized, such as OpenLDAP, username/password, digitally signed messages, multi-factor authentication, Cellular Authentication and Voice Encryption (CAVE) based authentication, challenge-response authentication mechanisms (CRAM), digest access authentication, other authentication protocols (e.g., Password Authentication Protocol (PAP), Challenge-Handshake Authentication Protocol (CHAP), Extensible Authentication Protocol (EAP), Terminal Access Controller Access-Control System (TACACS) protocols, Remote Authentication Dial-In User Service (RADIUS) protocol, Diameter protocol, Authentication and Key Agreement (AKA) protocol, OpenID protocol, password-authenticated key agreement protocols, Protocol for Carrying Authentication for Network Access (PANA), Secure Remote Password (SRP) protocol, Radio Frequency Identification (RFID) authentication protocols, Woo Lam 92 protocol, etc.), and the like.

In an embodiment, the user of the client device 102 submits a web service request, via the client device 102, to the managed directory service 104 to obtain a session token usable to access resources and services provided by the computing resource service provider. The client device 102 determines whether the user has been authenticated. In an embodiment, the client device 102 determines whether the ticket-granting ticket provided by the domain controller 106 is still active and has not expired. If the ticket-granting ticket is active, the client device 102 issues a service ticket, which is provided with the request from the user to the managed directory service 104. In response to receiving the request, the managed directory service 104 authenticates the request by validating the provided service ticket. If the service ticket cannot be validated, the managed directory service 104 rejects the user request. Similarly, if the service ticket has expired, the managed directory 104 rejects the user request. In an embodiment, the request specifies a desired access control role that the user is to assume for accessing resources and services of the computing resource service provider. This access control role is associated with one or more access control policies usable to determine whether access to computing resources and services is authorized.

In an embodiment, the managed directory service is a computer system, collection of computer systems, servers, applications, and/or processes of a computing resource service provider that provides directory services, as described herein, to customers of the computing resource service provider. In an embodiment, at least one component of the managed directory service stores, on a non-transitory, computer-readable storage medium instructions executable by one or more processors to cause the component to perform one or more operations described herein as performed by the managed directory service. In an embodiment, the managed directory service utilizes the service ticket provided in the request to identify a directory corresponding to a customer of the computing resource service provider. This customer, in an embodiment, maintains the on-premises network and the client device 102, which the user utilizes to access the managed directory service 104. In an embodiment, the user is an employee of the customer, an administrator of the on-premises network, an application or other process associated with the on-premises network or the customer, or the customer itself. In an embodiment, the managed directory service evaluates the corresponding directory to determine whether the customer has configured to directory for use of session tokens. In an embodiment, the customer of the computing resource service provider submits a request to the managed directory service 104 to specify that its directory is leveraging session tokens to access resources and services of the computing resource service provider. In an embodiment, this is specified via a directory attribute. Thus, in response to the request from the client device 102, the managed directory service 104 determines whether this attribute is present in the directory and, based at least in part on user information specified in the directory, determine whether the user is authorized to have a session token issued to it.

In an embodiment, if the directory is configured for use of session tokens, the managed directory service 104 queries a security group database to determine whether the user of the client device 102 is a member of a security group corresponding to an access control role that can be assumed by members of the security group. In an embodiment, a security group is a collection of user accounts and identities that is managed as a single unit. In an embodiment, access to shared resources is controlled via the security group via group policy settings, such that user accounts and identities assigned to the security group are subject to these group policy settings.

In an embodiment, the customer can create, through the security group database, one or more security groups. Further, for each security group, the customer can specify identifiers or other information of users that are associated with the security group. In an embodiment, an entry for a security group in the security group database specifies the corresponding access control role that can be assumed by members of the security group. Each access control role specified in the security group database corresponds to one or more access control policies maintained by a policy management service 108. In an embodiment, a customer can create these one or more access control policies, which define the permissions for users and roles that can be assumed by users that attempt to access computing resources and services of the computing resource service provider. Thus, if the managed directory service 104 determines that the user of the client device 102 is a member of a particular security group defined in the security group database, the directory service 104 identifies, from the security group database, the access control role that the user can assume.

In an embodiment, the request from the client device 102 specifies a particular access control role that the user of the client device 102 wishes to assume. If the request specifies a specific access control role, the managed directory service 104 queries the security group database to determine whether the user is a member of a security group associated with the specified access control role. If the user is not a member of any security groups associated with the specified access control role, the managed directory service 104 rejects the request from the user. In an embodiment, if the user is not a member of any security groups associated with the specified access control role but, rather, the user is a member of an alternative security group associated with another access control role, the managed directory service 104 transmits a notification to the client device 102 to indicate the access control role that the user can assume. Thus, the user of the client device 102 can assume this alternative role if the requested access control role is not available to the user.

In an embodiment, if the user is a member of a security group specified in the security group database, the managed directory service 104 transmits a request to the policy management service 108 to obtain the session token 110. In an embodiment, the request specifies the access control role that is to be assumed by the user of the client device 102, as well as user information of the user of the client device 102. The access control role and the user information are used to determine whether the user is authorized to assume the access control role. In response to the request from the managed directory service 104, the policy management service 108 identifies any policies applicable to the user of the client device 102. These policies specify whether the user of the client device 102 is authorized to obtain the requested session token and to assume the access control role specified in the request from the managed directory service 104.

In an embodiment, a policy management service 108 provides access to, and administration of, policies applicable to requests for access to computing resource provider services. For example, the policy management service 108 can receive information sufficient for selecting policies applicable to pending requests, such as web service application programming interface (API) requests. In an embodiment, the information can include copies of the requests, or can include information generated based at least in part on the requests. For example, a service such as a service frontend can receive a request for access to resources and can generate a query to the policy management service 108 based at least in part on information specified by the request. The policy management service 108 is a distributed computer system configured to centrally manage policies for multiple services operated by the computing resource service provider. Requests for access to service resources (i.e., requests whose fulfillment involves access to the resources themselves and/or information about the resources) are evaluated against one or more policies associated with the request and/or associated with the requester and those requests that are allowable based on those polices are performed. API calls to create, edit, and/or delete policies can also be received by the policy management service 108. As policies can change, so too can the scope of requests that are allowable change. For example, an organization can have a default policy allowing reads from all storage resources of a certain class. Barring a specific policy restricting a certain user from performing such reads, the default policy would permit such reads by any user. A change to a default policy preventing all reads from that class of storage resource can prevent that certain user from reading from such resources, and may require that specific permissions be granted if that user required that access. Granting such permissions can require that the policy be edited to change the permissions.

In an embodiment, the policy management service 108 determines whether the managed directory service is authorized to obtain the session token 110 on behalf of the user of the client device 102. In an embodiment, a customer can create an access control policy whereby only certain entities can obtain a session token on behalf of users of client devices operated in the on-premises network. Thus, if the customer does not authorize, through an access control policy, access to the session token 110 by the managed directory service 104, the policy management service 108 rejects the request from the managed directory service 104 to obtain the session token on behalf of the user of the client device 102.

In an embodiment, if the policy management service 108 determines that the user of the client device 102 is authorized to assume the specified access control role and to obtain a session token, access key, and cryptographic key that are usable to assume the access control role, the policy management service 108 generates the session token 110. This session token 110 specifies an expiration time for the access key and the cryptographic key. Thus, if a user submits a request that includes an expired session token 110, the policy management service 108 denies the request. The access key serves as the user's credential information for assuming the access control role and for identifying policies applicable to the user's request to access computing resources and services provided by the computing resource service provider. The cryptographic key is usable by the user to encrypt the session token 110. Thus, the policy management service 108 can authenticate a user request by decrypting the session token 110 and evaluating the session token 110 to determine whether the access key is valid for use.

In an embodiment, the policy management service 108 provides the session token 110, the access key, and the cryptographic key to the managed directory service 104. In response to receiving the session token 110, the access key, and the cryptographic key from the policy management service 108, the managed directory service 104 provides the session token 110, access key, and cryptographic key to the user of the client device 102 to fulfill the user's request.

In an embodiment, the user of the client device 102 submits a web service request to the computing resource service provider to access one or more resources and services provided by the computing resource service provider. The web service request includes the access key and the session token 110, which is encrypted using the cryptographic key. In an embodiment, the request also includes the service ticket. The policy management service 108 obtains the request from the client device 102 and transmits the service ticket to the managed directory service 104 for authentication. If the service ticket has expired, the request from the user of the client device 102 is rejected. In an embodiment, if the service ticket is authenticated, the policy management service 108 uses its cryptographic key to decrypt the session token 110. The policy management service 108 utilizes the session token 110 to determine whether the access key provided in the request has expired. If decryption of the session token 110 cannot be completed or the access key has expired, the policy management service 108 rejects the request from the user of the client device 102.

In an embodiment, if the request is authenticated, the policy management service 108 uses the access key to determine which access control role the user is to assume within the computing resource service provider network. Based at least in part on the access control role assumed by the user, the policy management service 108 identifies one or more access control policies that are applicable to the request. The one or more access control policies include policies that are applicable to the resources and services that have been requested. Further, the one or more access control policies include policies that are applicable to the access control role itself. Thus, the policy management service 108 evaluates the request against the identified access control policies to determine whether fulfillment of the request from the user of the client device 102 is authorized. If, based at least in part on the applicable access control policies, fulfillment of the request from the user of the client device 102 is authorized, the policy management service 108 transmits a notification to the applicable computing resource services to indicate that fulfillment of the request is authorized. Thus, the user of the client device 102 can access the resources and services specified in the request in accordance with the applicable access control policies.

Figure 2:
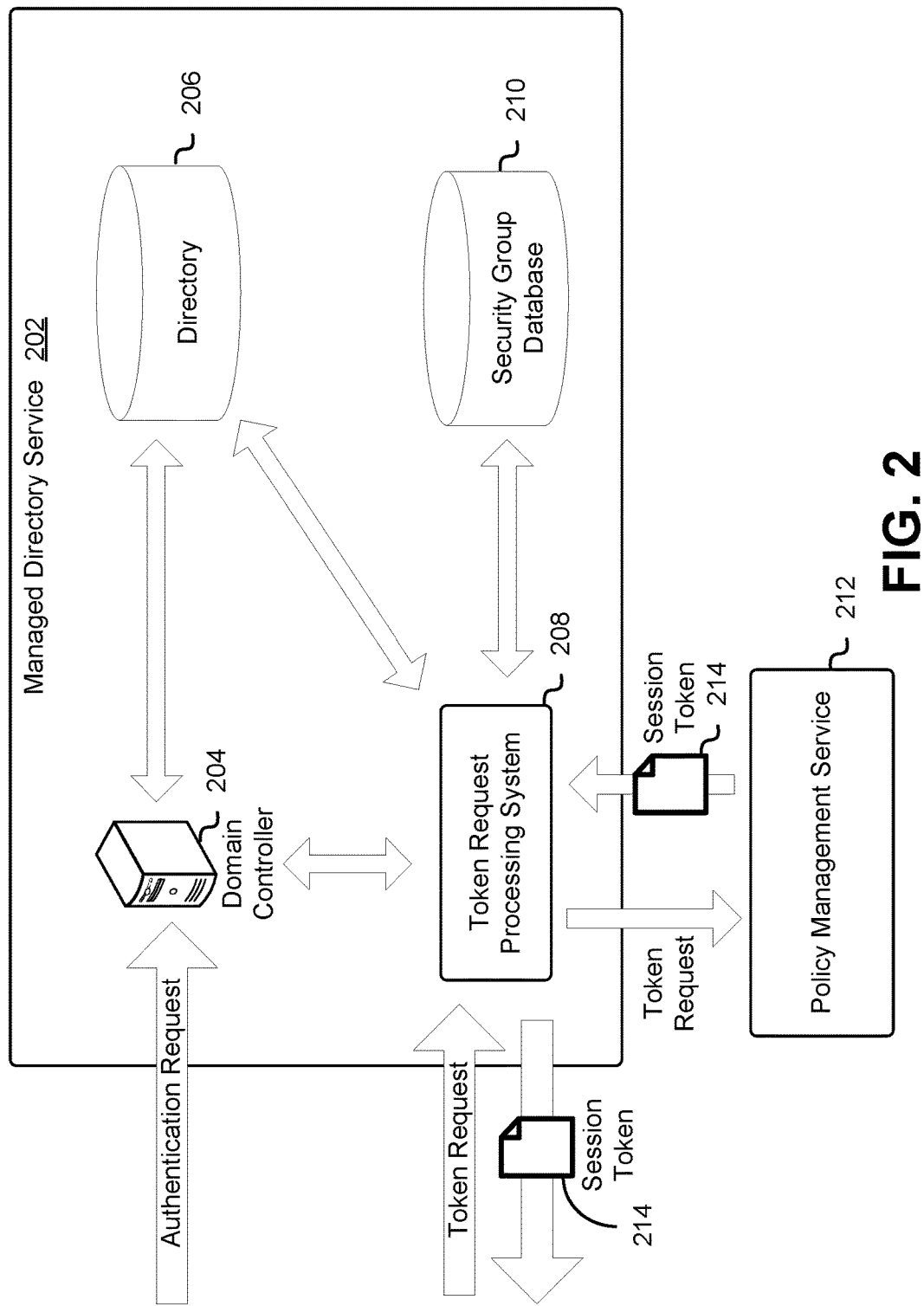
FIG. 2 shows an illustrative example of a system in which a request for a session token is processed by a managed directory service in accordance with an embodiment.

FIG. 2 shows an illustrative example of a system 200 in which a request for a session token 214 is processed by a managed directory service 202 in accordance with an embodiment. In the system 200, a domain controller 204 of the managed directory service 202 receives a request from a client device operated in an on-premises network to obtain a ticket-granting ticket. In an embodiment, the domain controller 204 is a server, computer system, or application that responds to authentication requests within a computing domain and enables access to domain resources and services. In an embodiment, the domain controller 204 and the client device operate using the Kerberos protocol for authentication. In an embodiment, a user of the client device provides credential information of the user, which the client device provides to the domain controller 204 in the authentication service request. In an embodiment, the client device encrypts a timestamp corresponding to the time at which the user provider its credentials using a hash of these credentials. This encrypted timestamp is used by the domain controller 204 to determine whether the request has expired. If the domain controller 204 determines, based at least in part on the timestamp, that the request has expired, the domain controller 204 rejects the request. In an embodiment, if the request has not expired, the domain controller 204 transmits a message to the client device. This message includes a ticket-granting ticket, which is cached within the client device. The ticket-granting ticket is utilized by the client device to generate a service ticket that can be used by the user of the client device to submit a web service request to a token request processing system 208 of the managed directory service 202 to obtain a session token 214 for accessing computing resources and services provided by the computing resource service provider within the computing resource service provider network.

In an embodiment, the token request processing system 208 is a computer system, application, or process of the managed directory service 202 that receives web service requests from client devices operating in distinct networks (e.g., an on-premises network) and determines whether the request can be processed and provided to a policy management service 212 for creation of the session token 214. The web service request from the client device, in an embodiment, includes a service ticket generated by the client device in response to the user of the client device providing its ticket-granting ticket. In an embodiment, the token request processing system 208 utilizes the service ticket provided in the request to identify a directory 206 corresponding to a customer of the computing resource service provider. In an embodiment, the service ticket specifies an identifier of a customer of the managed directory service 202. The token request processing system 208 utilizes this identifier to identify the directory 206 associated with an account of the customer.

In an embodiment, the web service request is transmitted to the token request processing system 208 using the Representation State Transfer (REST) protocol. In an embodiment, REST relies on the Hypertext Transfer Protocol (HTTP) for connecting the client device to the token request processing system 208 and for transmitting commands. The token request processing system 208 validates the web service request, as described below, and transmits structured data (e.g., an Extensible Markup Language (XML) file, etc.) to the client device using REST. Alternatives to REST can be used for communications between the client device and the token request processing system 208, such as Simple Object Access Protocol (SOAP) or JavaScript Object Notation (JSON).

In an embodiment, the token request processing system 208 evaluates the corresponding directory 206 to determine whether the customer has configured the directory 206 for use of session tokens. In an embodiment, the directory 206 is a data structure used for hierarchical and internal storage of organizational data managed by the managed directory service 202. In an embodiment, the directory 206 is a "managed directory" as it is maintained by the managed directory service 202 on behalf of a customer of the computing resource service provider. In an embodiment, the managed directory is hosted on hardware of the computing resource service provider and managed (e.g., configured, provisioned, updated, etc.) in accordance with remote instructions submitted over a network, such as instructions sent by API calls to the managed directory service and/or by remote interaction with the directory itself. In an embodiment, the directory 206 includes a database of information about various objects in the directory 206. The objects, in an embodiment, correspond to resources and security principals and, therefore, include user access objects, policy objects, store objects, application link objects, security objects, and/or other such objects. A directory database, in an embodiment, can store relationships between those database objects, so that the directory is usable to manage which users have access to which resources. In an embodiment, the customer of the computing resource service provider submits a request to the managed directory service 202 to specify that its directory 206 is leveraging session tokens to access resources and services of the computing resource service provider. In an embodiment, this is specified via a directory attribute. Thus, in response to the request from the client device, the token request processing system 208 determines whether this attribute is present in the directory 206 and, based at least in part on user information specified in the directory 206, determine whether the user is authorized to have a session token 214 issued to it.

In an embodiment, if the token request processing system 208 determines that the directory 206 is configured for use of session tokens, the token request processing system 208 queries a security group database 210 to determine whether the user is a member of a security group corresponding to an access control role. The security group database 210, in an embodiment, includes an entry for each security group defined by customers of the managed directory service 202. The entry may define the access control role that corresponds to the security group, as well as identifiers corresponding to users of a directory 206 that are assigned members of the security group. In an embodiment, if a user is associated with a particular security group defined in the security group database 210, the user may be authorized to assume the access control role. In an embodiment, if a user is associated with a particular security group defined in the security group database 210, the token request processing system 208 identifies the access control role associated with the security group entry and includes an identifier corresponding to the access control role in a request to the policy management service 212 to obtain the session token 214. In an embodiment, if the user is not a member of a security group defined in the security group database 210 or the directory 206 is not configured for use of session tokens, the request from the client device is denied.

In an embodiment, if the user is a member of a security group specified in the security group database 210 and, as a result, is authorized to assume an access control role, the token request processing system 208 generate a request to obtain the session token 214. In an embodiment, the request specifies the access control role associated with the security group identified from the security group database 210, as well as user information of the user of the client device. In response to receiving the request from the token request processing system 208, the policy management service 212 uses the specified access control role and the user information to determine whether the user is authorized to assume the access control role. In an embodiment, the policy management service 212 utilizes the specified user information and the access control role to identify any policies applicable to the user of the client device and to the request itself. These policies specify whether the user of the client device is authorized to obtain the requested session token and to assume the access control role specified in the request from the token request processing system 208.

In an embodiment, if the policy management service 212 determines that the identified access control role does not exist or that the user is not authorized, based at least in part on identified policies, to assume the access control role, the policy management service denies the request from the token request processing system 208. If the request is denied, the token request processing system 208 transmits a notification to the user of the client device indicating that the session token 214 could not be obtained.

In an embodiment, if the policy management service 212 determines, based at least in part on policies corresponding to the access control role and the user information specified in the request, that the user is authorized to assume the access control role, the policy management service 212 generates the session token 214, as well as an access key and a cryptographic key usable to encrypt the session token 214. The session token 214, in an embodiment, specifies an expiration time for the access key and the cryptographic key. Thus, if a user submits a request that includes an expired session token 214, the policy management service 212 denies the request. The access key serves as the user's credential information for assuming the access control role and for identifying policies applicable to the user's request to access computing resources and services provided by the computing resource service provider. In an embodiment, the policy management service 212 provides the session token 214, the access key, and the cryptographic key to the token request processing system 208 to fulfill the request from the token request processing system 208. In response to receiving the session token 214, the access key, and the cryptographic key from the policy management service 212, token request processing system 208 provides the session token 214, access key, and cryptographic key to the user of the client device to fulfill the user's request.

Figure 3:
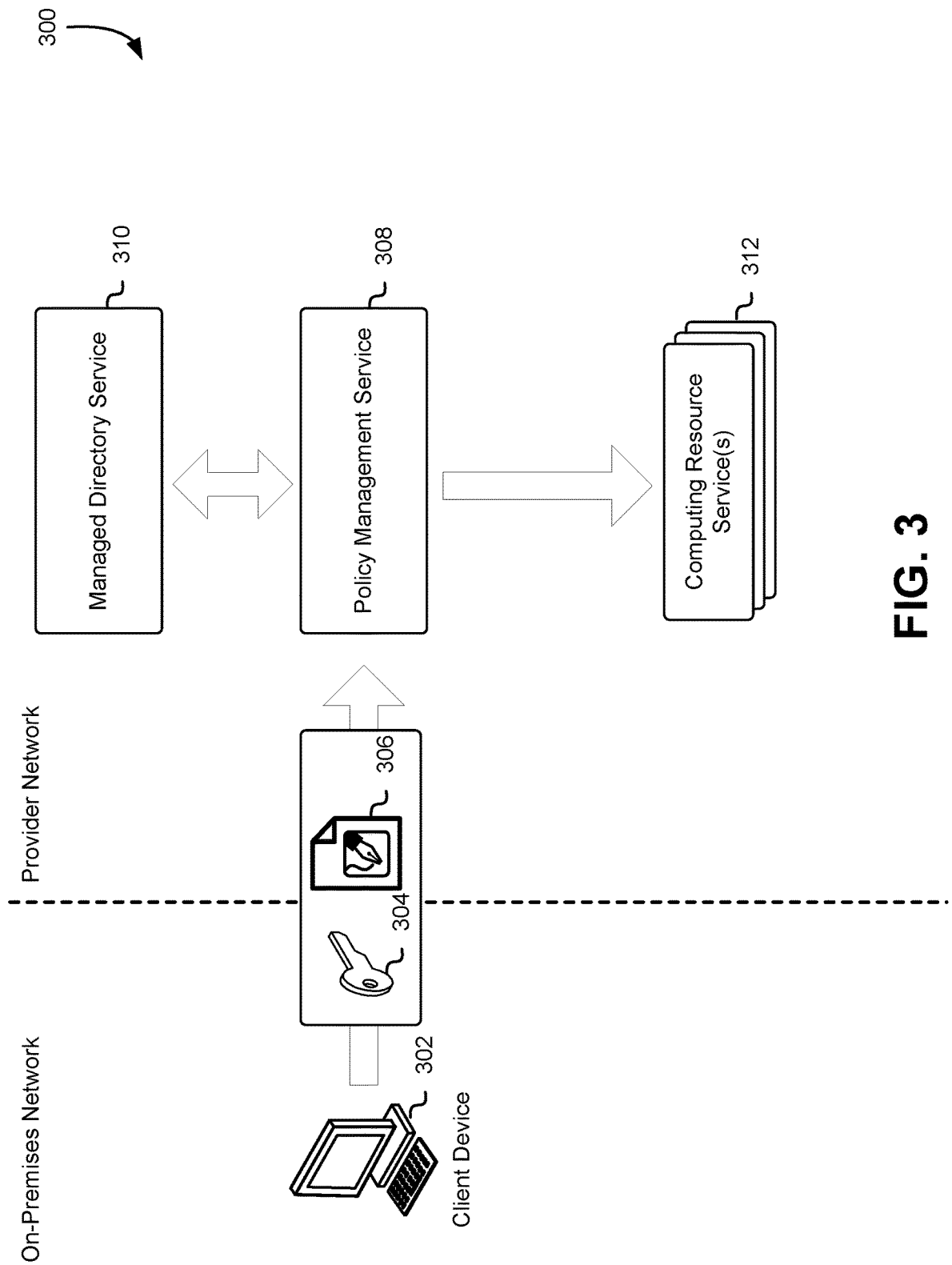
FIG. 3 shows an illustrative example of a system in which a policy management service evaluates a request from a client device operating within an on-premises network to determine whether to fulfill the request in accordance with an embodiment.

FIG. 3 shows an illustrative example of a system 300 in which a policy management service 308 evaluates a request from a client device 302 operating within an on-premises network to determine whether to fulfill the request in accordance with an embodiment. In the system 300, the client device 302 transmits a request to a computing resource service provider to access resources maintained via one or more computing resource services 312. In an embodiment, the request from the user client device 302 includes an access key 304 and an encrypted session token 306. In an embodiment, the encrypted session token 306 is generated by the client device 302 by utilizing a cryptographic key provided by the policy management service 308 to the client device 302 through the process described above in connection with FIG. 2. The session token 306 specifies an expiration time for the access key 304 and the cryptographic key usable to encrypt the session token 306. In an embodiment, the client device 302 submits, with the request, a service ticket generated using the ticket-granting ticket provided to the user of the client device 302. This service ticket is usable by the managed directory service 310 to authenticate the client device 302.

In an embodiment, the request from the client device 302 to the one or more computing resource services 312 is initially processed by the policy management service 308. The policy management service 308 transmits the service ticket to the managed directory service 310 for authentication. The domain controller of the managed directory service 310 evaluates the service ticket to ensure that the service ticket has not expired. If the service ticket has expired, the managed directory service 310 transmits a notification to the policy management service 308 to indicate that the service ticket is not valid. If the policy management service 308 receives this notification from the managed directory service 310, the policy management service 308 rejects the request from the user of the client device 302 and transmits a notification to the client device 302 to indicate that the request was rejected.

In an embodiment, if the service ticket is authenticated, the policy management service 308 identifies a cryptographic key associated with the access key 304 and uses its cryptographic key to decrypt the encrypted session token 306. The policy management service 308 utilizes the session token to determine whether the access key 304 provided in the request has expired. If decryption of the encrypted session token 306 cannot be completed or the access key 304 has expired, the policy management service 308 rejects the request from the user of the client device 302.

In an embodiment, if the request is authenticated, the policy management service 308 uses the access key 304 to determine which access control role the user is to assume within the computing resource service provider network. In an embodiment, the access key 304 specifies an identifier corresponding to the access control role. Based at least in part on the access control role specified in the access key 304, as well as user information of the user of the client device 302 and the parameters of the request (e.g., which resources are requested, the operations to be performed using the specified resources, etc.), the policy management service 308 identifies one or more access control policies that are applicable to the request. The one or more access control policies include policies that are applicable to the resources and computing resource services 312 that have been requested. Thus, the policy management service 308 evaluates the request against the identified access control policies to determine whether fulfillment of the request from the user of the client device 302 is authorized.

In an embodiment, if the policy management service 308 determines, based at least in part on the applicable access control policies, that the request cannot be fulfilled, the policy management service 308 transmits a notification to the client device 302 to indicate that the request has been denied. In an embodiment, the request can be denied as a result of an access control policy indicating that users assuming the specified access control role are not authorized to have the request fulfilled (e.g., the access control role does not enable performance of operations specified in the request). If, based at least in part on the applicable access control policies, fulfillment of the request from the user of the client device 302 is authorized, the policy management service 308 transmits a notification to the applicable computing resource services 312 to indicate that fulfillment of the request is authorized. This enables the user of the client device 302 to access the applicable computing resource services 312 and perform the requested operations in accordance with the access control policies.

Figure 4:
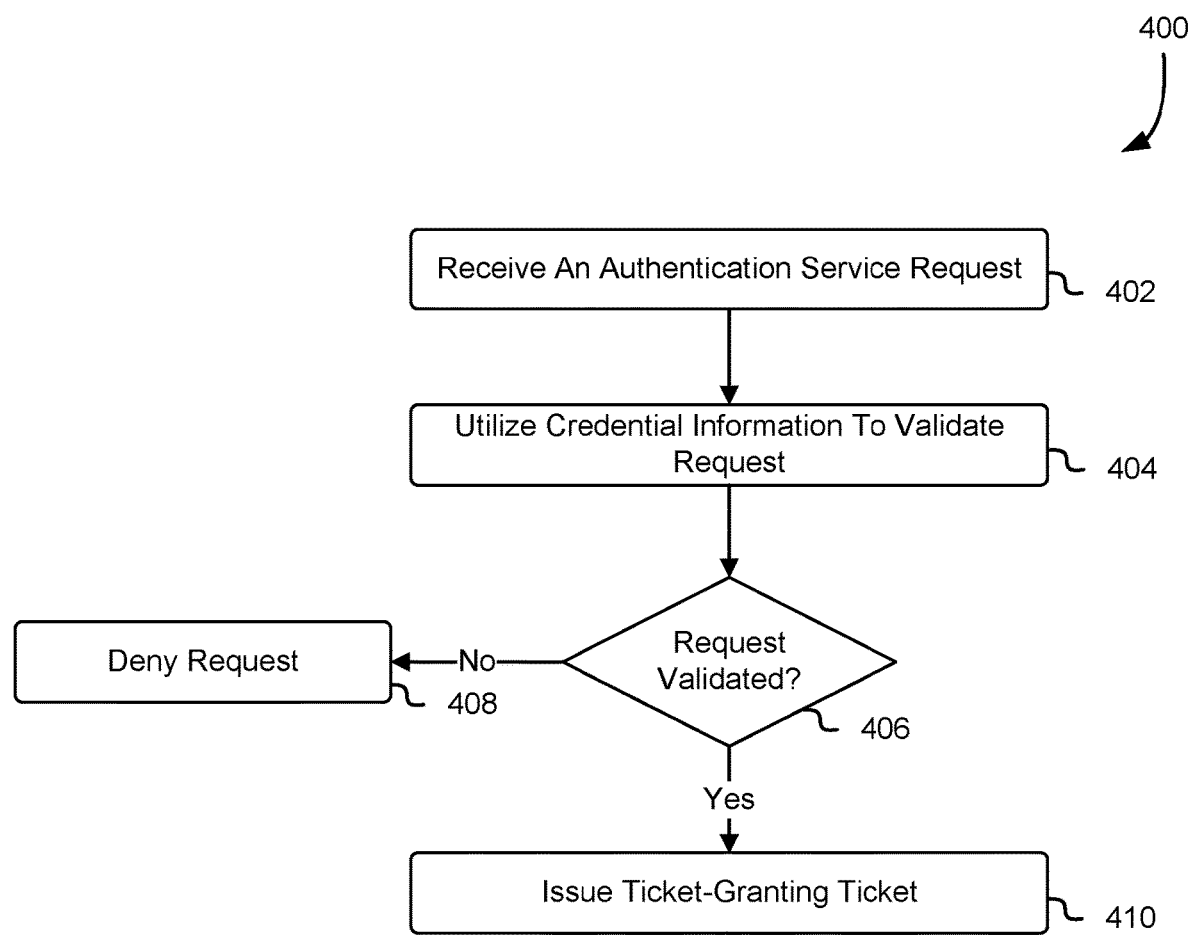
FIG. 4 shows an illustrative example of a process for authentication of a client device operating in an on-premises network and that is joined to a managed directory in accordance with an embodiment.

FIG. 4 shows an illustrative example of a process 400 for authentication of a client device operating in an on-premises network and that is joined to a managed directory in accordance with an embodiment. In an embodiment, the process 400 is performed by a domain controller of a managed directory service, which operates in a computing resource service provider network and interacts with client devices and other resources from a customer's on-premises network. In an embodiment, the client devices and other resources from the customer's on-premises network are domain joined to the directory in the managed directory service and the domain controller. In an embodiment, the client device transmits directory credentials to the managed directory service to join the client device to a directory managed by the managed directory service. This enables the client device to interact with the domain controller and access the directory.

In an embodiment, the domain controller receives 402 an authentication service request from a client device operated in a customer's on-premises network. In an embodiment, a user of the client device provides credential information of the user, which the client device provides to the domain controller in an authentication service request. In an embodiment, the client device encrypts a timestamp corresponding to the time at which the user provided its credentials using a hash of these credentials. The domain controller, in an embodiment, maintains a local copy of the hash of these credentials, which the domain controller can use to decrypt the encrypted timestamp.

In an embodiment, the domain controller utilizes 404 its local copy of the user's credential information to validate the request. In an embodiment, the domain controller uses the hash of the user's credentials to decrypt the provided encrypted timestamp from the request. If the domain controller is successful in decrypting the encrypted timestamp, the domain controller evaluates the timestamp to determine whether the request from the user was made within a clock skew tolerance. Through the process of decrypting the encrypted timestamp and of evaluating the timestamp, the domain controller determines 406 whether the request is valid. In an embodiment, if the domain controller is unable to decrypt the encrypted timestamp, the domain controller transmits a notification to the user client indicating an error in processing the authentication service request and denies 408 the authentication service request. In an embodiment, if decryption of the encrypted timestamp is successful but the timestamp is outside of the clock skew tolerance (e.g., the timestamp corresponds to a time outside of acceptable limits and exceeds the tolerance), the domain controller denies 408 the authentication service request.

In an embodiment, if the domain controller determines that the authentication service request is valid, the domain controller issues 410 a ticket-granting ticket to the user of the client device, fulfilling the authentication service request. The ticket-granting ticket is provided in an authentication service reply message to the user of the client device. This authentication service reply includes the embedded ticket-granting ticket. In response to receiving the authentication service reply from the domain controller, the client device caches the ticket-granting ticket for the lifetime of the ticket-granting ticket and disposes of the user's credentials. Thus, if the ticket-granting ticket expires, the client device disposes of the ticket-granting ticket. However, while the ticket-granting ticket is active, the user of the client device can use the ticket-granting ticket to obtain service tickets for use in accessing services of the on-premises network, including services usable to submit requests to the computing resource service provider to access resources and services of the computing resource service provider. In an embodiment, a service ticket is issued to the user to enable the user to submit, via the client device, a request to a managed directory service of the computing resource service provider to obtain a session token, access key, and cryptographic key usable to access other services of the computing resource service provider.

Figure 5:
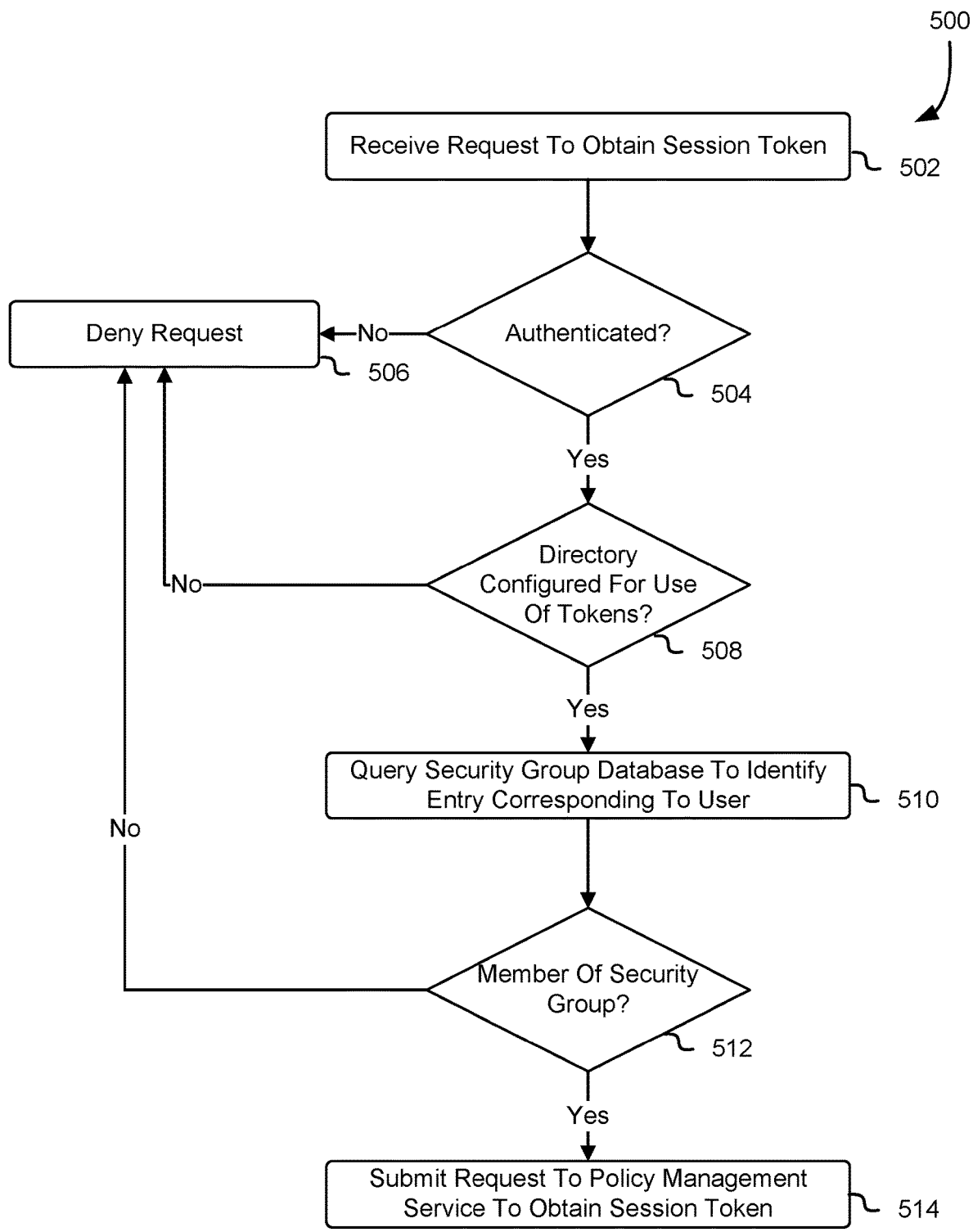
FIG. 5 shows an illustrative example of a process for determining whether a request to obtain a session token can be processed based at least in part on membership in a security group in accordance with an embodiment.

FIG. 5 shows an illustrative example of a process 500 for determining whether a request to obtain a session token can be processed based at least in part on membership in a security group in accordance with an embodiment. In an embodiment, the process 500 is performed by the token request processing system of the managed directory service.

It should be noted that while the token request processing system is illustrated, in FIG. 2, as being a system of the managed directory service, the token request processing system can be a stand-alone computer system that is separate from the managed directory service and, instead, communicates with the managed directory service to perform the operations described herein.

In an embodiment, the token request processing system receives 502 a request from a client device to obtain a session token that, in conjunction with an access key, is usable by the client device to access resources and services of a computing resource service provider. In an embodiment, the request includes a service ticket generated using the ticket-generating ticket on the client device. In an embodiment, the token request processing system utilizes the service ticket provided in the request to identify a directory corresponding to a customer of the computing resource service provider. In an embodiment, the token request processing system utilizes the domain controller of the managed directory service to determine 504 whether the request can be authenticated. In an embodiment, the domain controller determines if the service ticket has expired. If the token request processing system receives a notification from the domain controller indicating that the service ticket has expired, the token request processing system determines that the request cannot be authenticated. If the request cannot be authenticated, the token request processing system denies 506 the request. In an embodiment, if the request cannot be authenticated, the token request processing system transmits a notification to the client device to indicate that authentication of the user is needed. This causes the client device to utilize the ticket-generating ticket to generate a new service ticket for use in a new request to obtain a session token. If the ticket-generating ticket has expired, the client device can submit a new request to the domain controller to have a new ticket-generating ticket issued.

In an embodiment, if the request is successfully authenticated, the token request processing system evaluates the corresponding directory to determine 508 whether the customer has configured the directory for use of session tokens. In an embodiment, configuration of a directory for use of session tokens is specified via a directory attribute. Thus, in response to the request from the client device, the token request processing system determines whether this attribute is present in the directory and, based at least in part on user information specified in the directory, determine whether the user is authorized to have a session token issued to it. If the directory is not configured for use of session tokens, the token request processing system denies 506 the request for a session token.

In an embodiment, if the token request processing system determines that the directory is configured for use of session tokens, the token request processing system queries 510 a security group database to identify an entry corresponding to the user identified in the request. The security group database, in an embodiment, includes an entry for each security group defined by customers of the managed directory service. The entry can define the access control role that corresponds to the security group, as well as entries corresponding to users of a directory that are assigned members of the security group. In an embodiment, if a user is associated with a particular security group defined in the security group database, the user is authorized to assume the access control role. In an embodiment, the token request processing system determines 512 whether the user identified in the request is a member of a security group specified in the security group database. If the user is not a member of any security group specified in the security group database, the token request processing system determines that the user is not authorized to assume an access control role and, as a result, denies 506 the request to obtain a session token.

In an embodiment, if a user is associated with a particular security group defined in the security group database, the token request processing system identifies the access control role associated with the security group entry and includes an identifier corresponding to the access control role in a request to the policy management service to obtain the session token 214. In an embodiment, the token request processing system generates the request to obtain the session token. In an embodiment, the request specifies the access control role associated with the security group identified from the security group database, as well as user information of the user of the client device. The token request processing system submits 514 this request to the policy management system in order to obtain the session token, as well as the access key and cryptographic key.

Figure 6:
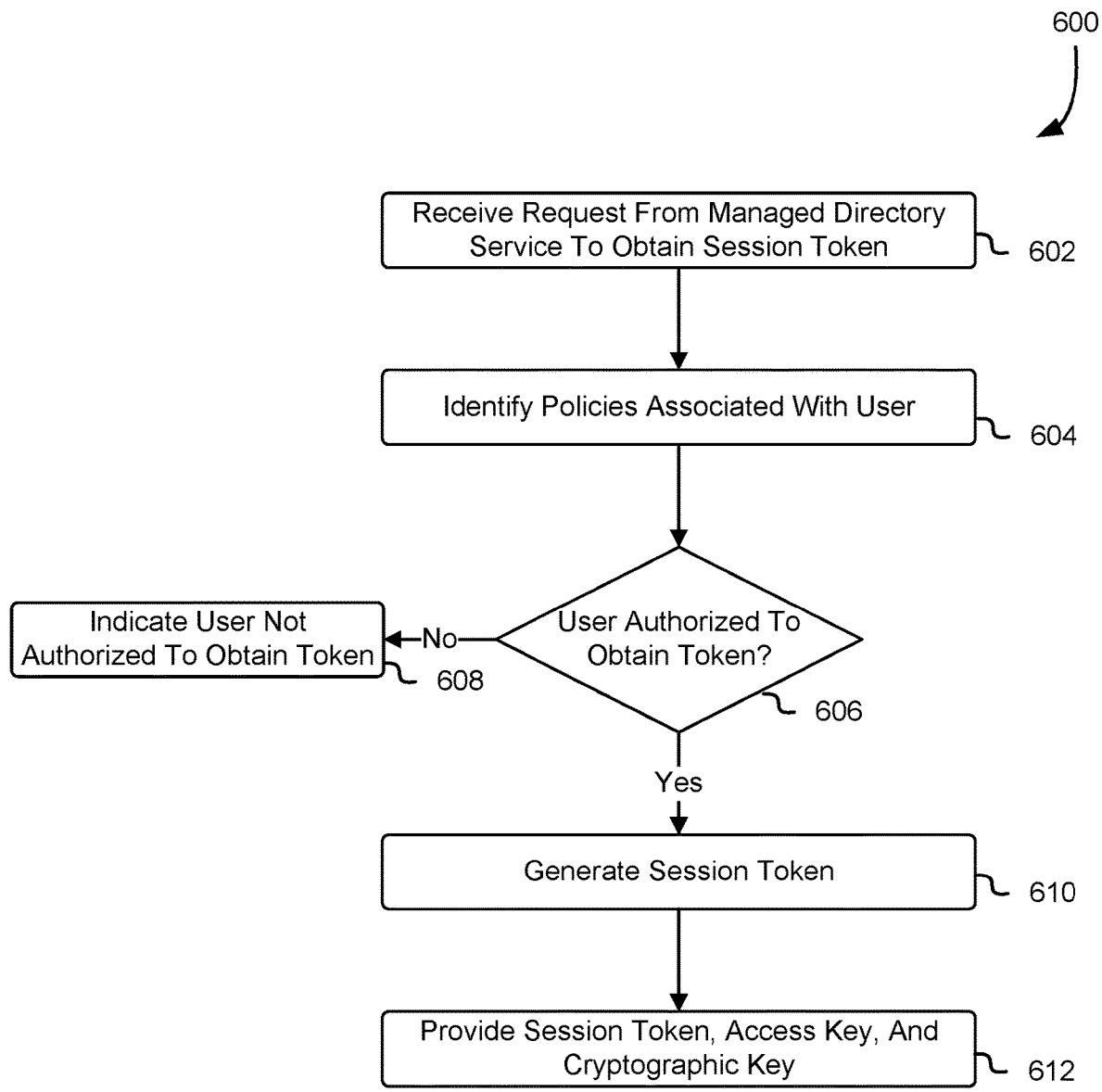
FIG. 6 shows an illustrative example of a process for providing a session token, access key, and cryptographic key in response to a request from a managed directory service in accordance with an embodiment.

FIG. 6 shows an illustrative example of a process 600 for providing a session token, access key, and cryptographic key in response to a request from a managed directory service in accordance with an embodiment. In an embodiment, the process 600 is performed by the policy management system, which processes incoming requests from the managed directory service to obtain session tokens, as well as requests from other entities (e.g., client devices, customers, etc.) to generate authorization decisions for enabling access to resources and services of the computing resource service provider. In an embodiment, the policy management service receives 602 a request from the managed directory service to obtain a session token for the user of a client device, as well as an access and cryptographic key. The cryptographic key is usable to encrypt the session token, which is used with the access key to enable the user of the client device to assume an access control role and to access resources and services of the computing resource service provider.

In an embodiment, the request from the managed directory service includes user information associated with the user of the client device. This user information can include a user identifier that is unique to the computing resource service provider and is associated with a user account maintained by the computing resource service provider. In an embodiment, the policy management service utilizes this user information to identify 604 one or more access control policies associated with the user. In an embodiment, an access control policy is a collection of permissions associated with a user, a group, a role, an organization, a company, or some other such entity. Each permission is associated with a computing resource and specifies whether the entity (also referred to herein as a "principal") can access that resource, under what conditions access is allowed or denied, and/or what type of access is allowed or denied. For example, a permission can specify that a user named "USER1" can access a certain data storage device denoted by identifier "12345." A more detailed permission can specify that USER1 can only read from resource 12345, but cannot write to resource 12345. A still more detailed permission can specify that USER1 can read from resource 12345 at any time, but can only write to resource 12345 between the hours of 9:00 and 9:30 AM. Permissions can also be associated with classes or collections of resources so that, for example, USER1 can have access to a collection of data storage devices, one of which is resource 12345. Principals can include individual users, accounts, computing resource services, or other principal entities that are allowed or denied access to a computing resource. In an embodiment, an access control policy is a document that specifies the collection of permissions associated with a user, a group, a role, an organization, a company, or some other such entity. In an embodiment, the permissions are specified using a structured language (e.g., JSON, XML, YAML Ain't Markup Language (YAML), etc.). In an embodiment, the permissions are defined in an access control list stored in a database in associated with an applicable resource.

In an embodiment, the policy management service evaluates any access control policies associated with the user of the client device to determine 606 whether the user is authorized to obtain a session token, access key, and cryptographic key, which are usable to assume an access control role. In an embodiment, if an access control policy indicates that the user is not authorized to obtain the session key, access key, and cryptographic key, the policy management service transmits a notification to the managed directory service to indicate 608 that the user is not authorized to obtain the session key, access key, and cryptographic key. In an embodiment, if the policy management service is unable to identify an access control policy that authorizes the user to obtain the session key, access key, and cryptographic key, the policy management service transmits the notification to the managed directory service to indicate 608 that the user is not authorized to obtain the session key, access key, and cryptographic key.

In an embodiment, if the user of the client device is authorized to obtain the session token, access key, and the cryptographic key, the policy management service generates 610 the session token, access key, and the cryptographic key. In an embodiment, the session token specifies an expiration time for the access key and the cryptographic key. Thus, if a user submits a request that includes an expired session token, the policy management service denies the request. The access key serves as the user's credential information for assuming the access control role and for identifying policies applicable to the user's request to access computing resources and services provided by the computing resource service provider. The cryptographic key is usable by the user to encrypt the session token. Thus, the policy management service can authenticate a user request by decrypting the session token and evaluating the session token to determine whether the access key is valid for use. In an embodiment, the policy management service provides 612 the session token, access key, and the cryptographic key to the managed directory service to fulfill the request. In an embodiment the policy management service encrypts the session token, access key, and the cryptographic key using a shared secret or a public cryptographic key of the client device. This enables the session token, access key, and the cryptographic key to be provided to the client device securely. In an embodiment, the computer system can utilize a private cryptographic key of a cryptographic key pair that includes the public cryptographic key to decrypt the session token, access key, and the cryptographic key from the policy management service.

It should be noted that the process 600 can include additional or alternative operations that can be performed by the policy management service. In an embodiment, the policy management service determines whether the managed directory service is authorized to obtain the session token on behalf of the user of the client device. In an embodiment, a customer can create an access control policy whereby only certain entities can obtain a session token on behalf of users of client devices operated in the on-premises network. Thus, if the customer does not authorize, through an access control policy, access to the session token by the managed directory service, the policy management service rejects the request from the managed directory service to obtain the session token on behalf of the user of the client device.

Figure 7:
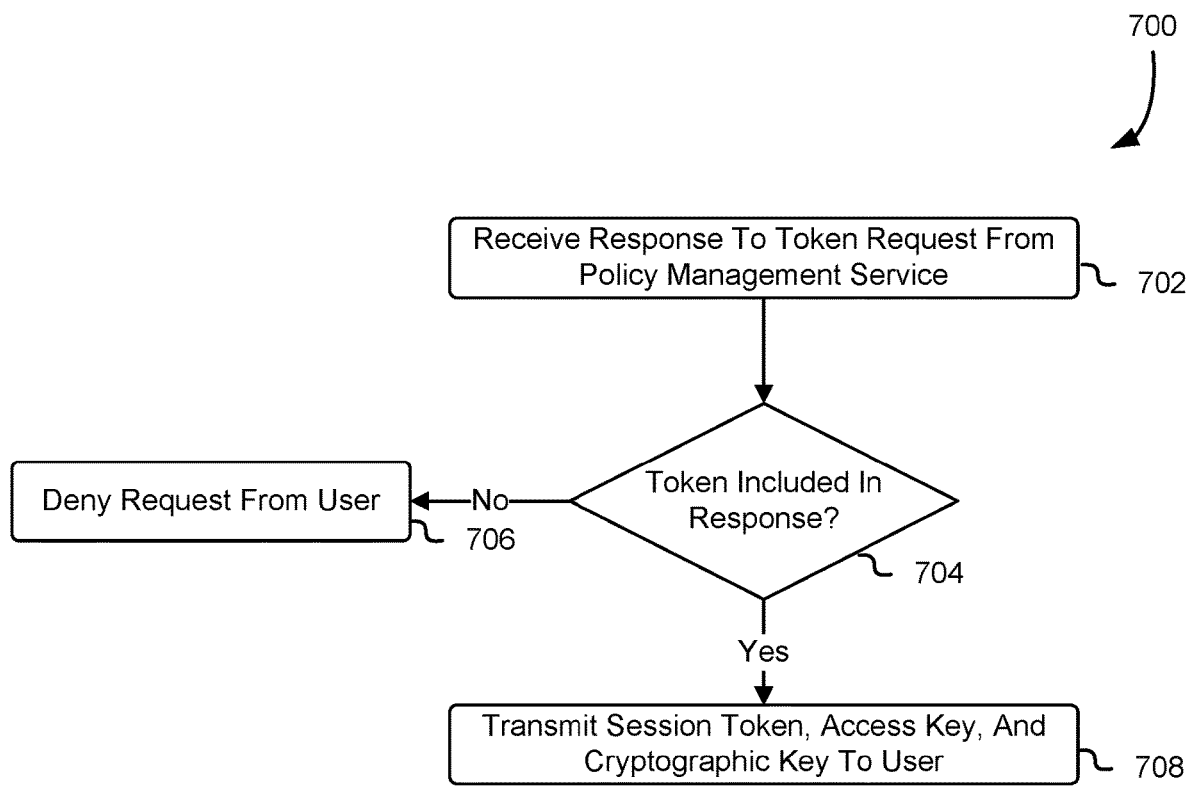
FIG. 7 shows an illustrative example of a process for transmitting a session token, access key, and cryptographic key to a client device in response to receiving a response from a policy management service in accordance with an embodiment.

FIG. 7 shows an illustrative example of a process 700 for transmitting a session token, access key, and cryptographic key to a client device in response to receiving a response from a policy management service in accordance with an embodiment. In an embodiment, the process 700 is performed by the managed directory service, which receives responses from the policy management service in response to requests to obtain session tokens, access keys, and cryptographic keys on behalf of users of client devices. In an embodiment, the managed directory service receives 702 a response to a previously submitted session token request from the policy management service.

In an embodiment, the managed directory service evaluates the response from the policy management service to determine 704 whether the response includes a session token, access key, and cryptographic key. If the response does not include the session token, access key, and/or the cryptographic key, the managed directory service determines that the user of the client device is not authorized to assume the access control role specified in the security group database. Thus, if the response does not include the session token, access key, and/or the cryptographic key, the managed directory service denies 706 the request from the user of the client device to obtain a session token, access key, and a cryptographic key. In an embodiment, the managed directory service transmits a notification to the client device to indicate that the user's request has been denied. In an embodiment, if the response from the policy management service includes a session token, access key, and a cryptographic key, the managed directory service transmits 708 the response to the user of the client device to fulfill the user's request.

Figure 8:
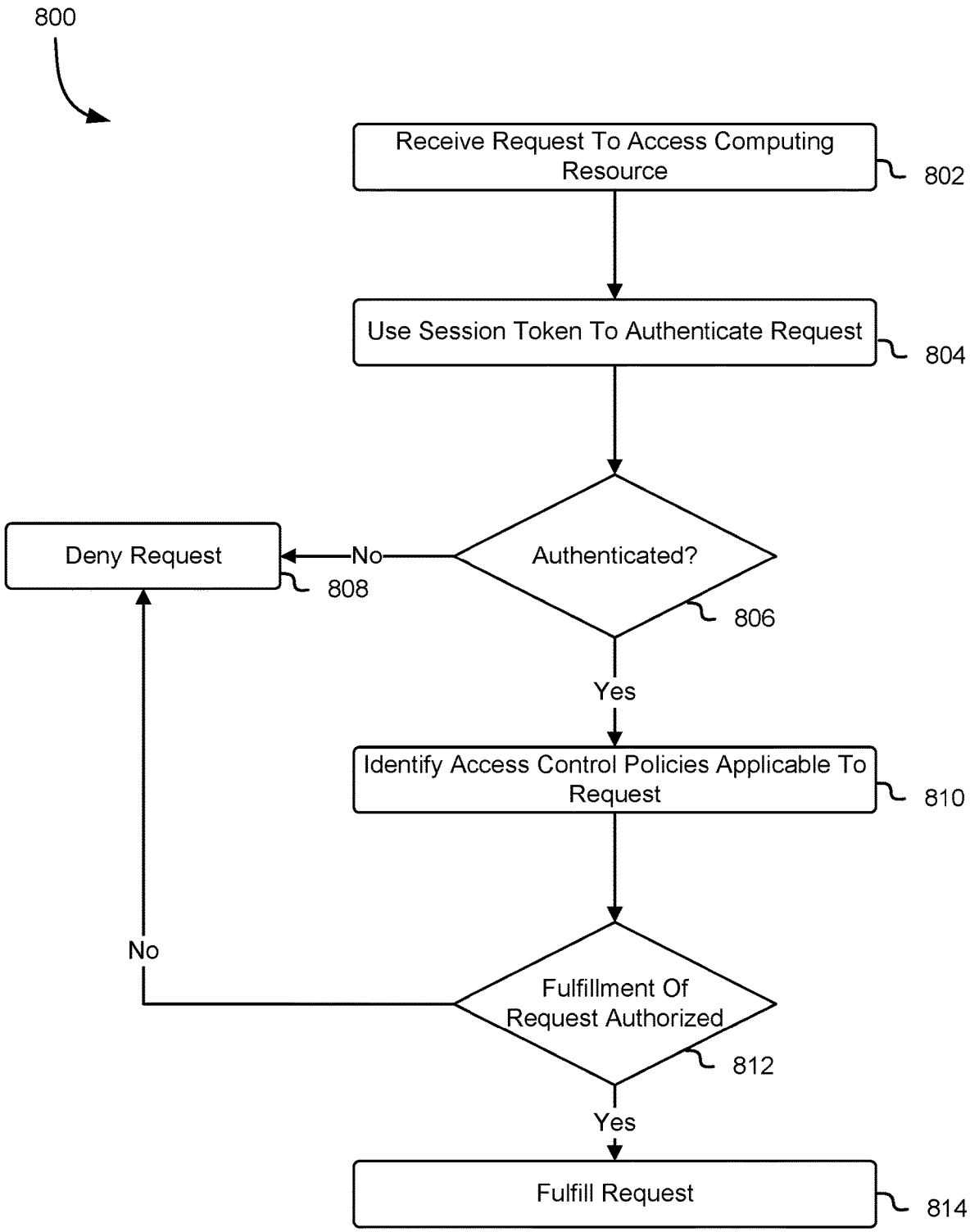
FIG. 8 shows an illustrative example of a process for utilizing a session token included in a request from a client device and policies applicable to request to determine whether the request can be fulfilled in accordance with an embodiment.

FIG. 8 shows an illustrative example of a process 800 for utilizing a session token included in a request from a client device and policies applicable to request to determine whether the request can be fulfilled in accordance with an embodiment. In an embodiment, the process 800 is performed by the policy management service, which may process requests from various entities to access resources and services of a computing resource service provider. In an embodiment, the policy management service receives requests from the services of the computing resource service provider in response to these services receiving user requests to access the services.

In an embodiment, the policy management service receives 802 a request to access a computing resource. In an embodiment, the request is from a client device on behalf of a user. In an embodiment, the request is from a service of a computing resource service provider. This service, in processing the request from a user of a client device, can submit the request to the policy management service in order to obtain an authorization decision, which is used to determine whether the request can be fulfilled by the service. In an embodiment, the request includes an encrypted session token, as well as an access key which defines an access control role that the user of the client device wishes to assume in order to access resources and services of the computing resource service provider. In an embodiment, the session token is encrypted using a cryptographic key previously provided by the policy management service.

In an embodiment, the policy management service utilizes the provided access key to identify a cryptographic key usable to decrypt the encrypted session token. This session token specifies an expiration time for the access key and the cryptographic key. Thus, if a user submits a request that includes an expired session token, the policy management service denies the request. The access key serves as the user's credential information for assuming the access control role and for identifying policies applicable to the user's request to access computing resources and services provided by the computing resource service provider. Thus, the policy management service uses 804 the session token from to determine 806 whether the request can be authenticated.

In an embodiment, if the session token is expired or the policy management service is unable to decrypt the encrypted session token from the request, the policy management service denies 808 the request. In an embodiment, if the request does not include an encrypted session token or the access key, the policy management service denies 808 the request. In an embodiment, if the access key is invalid (e.g., does not specify a valid access control role, is missing one or more fields, etc.), the policy management service denies 808 the request.

In an embodiment, if the session token and the access key are valid, the policy management service determines that the request has been authenticated. The policy management service utilizes the access key to identify the access control role that is to be assumed by the user of the client device. Based at least in part on the access control role specified in the access key, the identity of the user, and the resources and services to be accessed, the policy management service identifies 810 one or more access control policies that are applicable to the request. In an embodiment, the policy management service evaluates the identified access control policies to determine 812 whether fulfillment of the user's request is authorized. In an embodiment, if an access control policy specifies that users assuming the access control role specified in the access key are not authorized to have the request fulfilled, the policy management service denies 808 the request. In an embodiment, if the policy management service is unable to identify an access control policy that is applicable to the request, the policy management service denies 808 the request from the user.

In an embodiment, if fulfillment of the request is authorized based at least in part on the identified access control policies, the policy management service fulfills 814 the request. In an embodiment, fulfillment of the request includes transmitting a notification to the applicable computing resource services that obtained the request from the user, where the notification specifies that the request has been authorized for fulfillment. This causes the applicable computing resource services to enable the user to perform actions using resources of these computing resource services in accordance with the identified access control policies.

Figure 9:
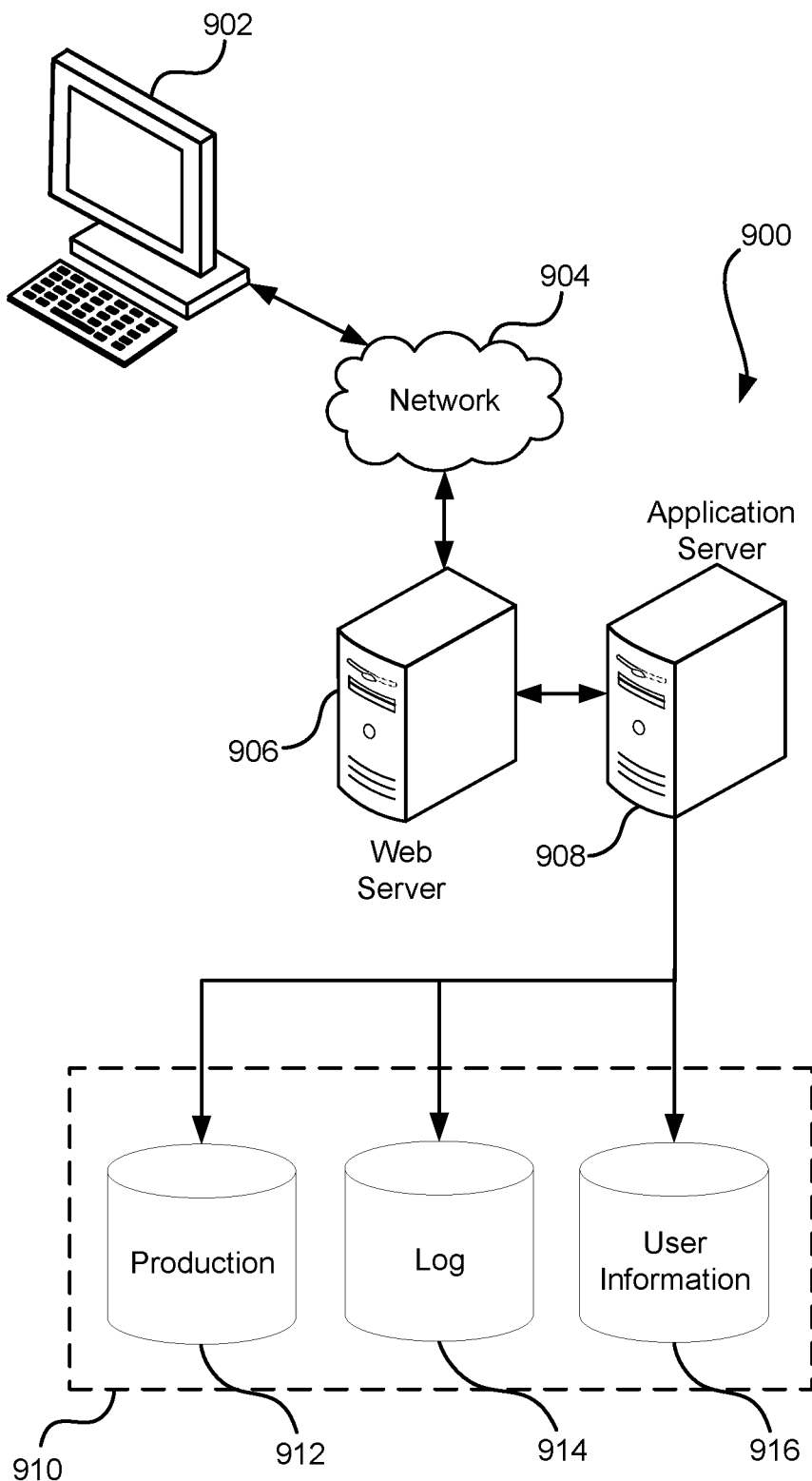
FIG. 9 illustrates a system in which various embodiments can be implemented.

FIG. 9 illustrates aspects of an example system 900 for implementing aspects in accordance with an embodiment. As will be appreciated, although a web-based system is used for purposes of explanation, different systems may be used, as appropriate, to implement various embodiments. In an embodiment, the system includes an electronic client device 902, which includes any appropriate device operable to send and/or receive requests, messages, or information over an appropriate network 904 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 906 for receiving requests and serving content in response thereto, although for other networks an alternative device serving a similar purpose could be used as would be apparent to one of ordinary skill in the art.

In an embodiment, the illustrative system includes at least one application server 908 and a data store 910 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 902 and the application server 908, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 910, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 912 and user information 916, which are used to serve content for the production side. The data store also is shown to include a mechanism for storing log data 914, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 910.

The data store 910, in an embodiment, is operable, through logic associated therewith, to receive instructions from the application server 908 and obtain, update or otherwise process data in response thereto and the application server 908 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 902. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 900 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 900, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining, from a computer system in a first network, a first web service request to join the computer system to a directory in a second network using directory credentials, the first web service request identifying a user, the first web service request further including a service ticket generated using a ticket-granting ticket provided by a domain controller in the second network;
   determining that the user identified in the request is a member of a security group specified in a security group database;
   using the directory credentials to authenticate the computer system to the directory;
   as a result of authenticating the computer system, providing a service ticket to the computer system;
   obtaining, from the computer system, a second web service request for a session token to access resources in the second network, the second web request including the service ticket;
   validating the service ticket by at least determining, based at least in part on the service ticket, whether a first set of permissions in the directory allow providing the session token to the computer system; and
   transmitting a set of credentials to the computer system to cause the computer system to use a second set of permissions outside of the directory to access the resources in the second network, the set of credentials including:
   an access key identifying the second set of permissions;
   a session token usable to determine the validity of the access key; and
   a cryptographic key to encrypt the session token.

2. The computer-implemented method of claim 1, wherein the method further comprises:
   querying a database of the directory to determine if a user of the computer system is associated with an entry in the database corresponding to a security group, the security group defining an access control role subject to the second set of permissions; and
   as a result of the entry specifying that the user of the computer system is associated with the security group, determining that the first set of permissions in the directory allow providing the session token to the computer system.

3. The computer-implemented method of claim 1, wherein the method further comprises transmitting, to the computer system, a cryptographic key usable to encrypt the session token and an access key usable to identify the second set of permissions.

4. The computer-implemented method of claim 1, wherein the session token is subject to an expiration time.

5. A system, comprising:
   one or more processors; and
   memory comprising computer-executable instructions that, if executed, cause the one or more processors to:
   obtain, from a computer system in a first network, a request to obtain a set of credentials usable to access resources in a second network, the request specifying a user and including a service ticket generated using a ticket-granting ticket provided by a domain controller associated with a directory in the second network;
   validate the user specified in the request against a security group database;
   determine that the service ticket is valid;
   provide a token to the computer system as a result of successful authentication of the computer system, the token identifying a member of the directory in the second network;
   determine, based at least in part on the token and a first set of permissions in the directory in the second network, that the computer system is authorized to obtain the set of credentials, wherein the set of credentials is associated with a second set of permissions to access the resources in the second network; and
   transmit the set of credentials to the computer system, the set of credentials including an access key usable to identify the second set of permissions, a session token usable to determine whether the access key is valid, and a cryptographic key to encrypt the session token.

6. The system of claim 5, wherein the computer-executable instructions that cause the one or more processors to determine that the computer system is authorized to obtain the set of credentials further cause the one or more processors to obtain the set of credentials as a result of the computer system being a member of a security group.

7. The system of claim 6, wherein the computer-executable instructions that cause the one or more processors to obtain the set of credentials further cause the one or more processors to:
   transmit, to a service that manages access control policies, a request to obtain the set of credentials, the request specifying an access control role associated with the second set of permissions; and
   obtain, from the service that manages access control policies, the set of credentials.

8. The system of claim 5, wherein the session token specifies an expiration of the session token.

9. The system of claim 5, wherein the set of credentials are encrypted using a public cryptographic key of the computer system, the set of credentials being decryptable by the computer system using a private cryptographic key of the computer system.

10. The system of claim 5, wherein the first network is an on-premises network and the second network is a service provider network, the on-premises network and the service provider network being distinct.

11. The system of claim 5, wherein the request specifies an access control role associated with the security group database.

12. The system of claim 5, wherein upon a determination that the service ticket expired, provide a notification to the computer system in the first network.

13. A non-transitory computer-readable storage medium comprising executable instructions that, as a result of execution by one or more processors of a computer system, cause the computer system to at least:
- obtain, from a second computer system in a first network, a request to obtain a set of credentials usable to access resources in a second network, the request including:
  - a username and;
  - a service ticket generated using a ticket-granting ticket obtained from a domain controller, the domain controller associated with a directory in the second network;
- determine that a user identified by the username exists in a security group database;
- determine validity of the service ticket;
- authenticate the second computer system;
- provide, to the second computer system, a data object usable to authenticate the second computer system as being allowed access to the resources;
- obtain, from the second computer system, a request to access the resources that includes the data object;
- determine, based at least in part on the data object, that a first set of permissions of the directory in the second network authorize the computer system to obtain the set of credentials, wherein the set of credentials are associated with a second set of permissions to access the resources in the second network; and
- transmit the set of credentials to the second computer system to cause the second computer system to access the resources in the second network, the set of credentials including an access key usable to identify the second set of permissions, a session token usable to determine whether the access key is valid, and a cryptographic key to encrypt the session token.

14. The non-transitory computer-readable storage medium of claim 13, wherein the set of credentials include at least an access key usable to identify the second set of permissions and a session token usable to determine whether the access key is valid.

15. The non-transitory computer-readable storage medium of claim 14, wherein the session token specifies an expiration of the session token.

16. The non-transitory computer-readable storage medium of claim 14, wherein the access key specifies an access control role assumable by the second computer system and associated with the second set of permissions.

17. The non-transitory computer-readable storage medium of claim 13, wherein the executable instructions that cause the computer system to determine that the first set of permissions of the directory in the second network authorize the computer system to obtain the set of credentials further cause the computer system to determine that the second computer system is a member of a security group.

18. The non-transitory computer-readable storage medium of claim 13, wherein the executable instructions further cause the computer system to:
- transmit, to a service that manages access control policies, a request to obtain the set of credentials, the request specifying an information of the second computer system usable to determine whether the second computer system is associated with the second set of permissions; and
- obtain, from the service that manages access control policies, the set of credentials.

19. The non-transitory computer-readable storage medium of claim 18, wherein the set of credentials are encrypted by the service that manages access control policies using a cryptographic key of the second computer system.

20. The non-transitory computer-readable storage medium of claim 18, wherein the second computer system is authenticated by a domain controller.

* * * * *